(12) United States Patent
Shu

(10) Patent No.: US 8,071,144 B2
(45) Date of Patent: Dec. 6, 2011

(54) CHEW TOY FOR PETS AND METHOD FOR MANUFACTURING THE SAME

(76) Inventor: Chia-Lung Shu, Hsinchuang (TW)

(*) Notice: Subject to any disclaimer, the term of this patent is extended or adjusted under 35 U.S.C. 154(b) by 755 days.

(21) Appl. No.: 12/283,375

(22) Filed: Sep. 11, 2008

(65) Prior Publication Data

US 2010/0058995 A1   Mar. 11, 2010

(51) Int. Cl.
*A23K 1/18* (2006.01)

(52) U.S. Cl. ............ 426/92; 426/89; 426/90; 426/93; 426/103; 426/132; 426/634; 426/641; 426/805; 119/710

(58) Field of Classification Search ............ 426/89, 426/90, 92, 93, 103, 132, 634, 641, 805; 119/710
See application file for complete search history.

(56) References Cited

U.S. PATENT DOCUMENTS

| 4,478,862 | A | * | 10/1984 | Greethead | 426/450 |
| 2004/0258830 | A1 | | 12/2004 | Shu | |
| 2005/0266146 | A1 | | 12/2005 | Shu | |
| 2008/0014311 | A1 | * | 1/2008 | Tepper et al. | 426/92 |

FOREIGN PATENT DOCUMENTS

| CN | 1803618 A | * | 7/2006 |
| EP | 1692946 A1 | * | 8/2006 |

* cited by examiner

*Primary Examiner* — C. Sayala
(74) *Attorney, Agent, or Firm* — William S. Pelton, Esq.; Cooper & Dunham LLP

(57) ABSTRACT

A method for manufacturing a chew toy for pets has steps of: producing a base layer and an outer layer; shaping the base layer; (c) applying the outer layer to the base layer to manufacture a semifinished material and drying the semifinished material to obtain a chew toy, wherein the base layer has poprice, sweet rice flour and water and the outer layer has soybean, animal parts and glycerol. The chew toy has poprice, sweet rice flour, soybean, animal parts and glycerol, therefore has a nutritional value, is easily digested and has health benefits for the pet, including strengthening their teeth and exercising their palate and jaw.

9 Claims, 2 Drawing Sheets

CHEW TOY FOR PETS AND METHOD FOR MANUFACTURING THE SAME

BACKGROUND OF THE INVENTION

1. Field of the Invention

The present invention relates to a chew toy for pets, especially to a chew toy for pets that is easily digested and has a nutritional value.

2. Description of the Prior Arts

Conventional chew toys for dogs and the like are often rawhide. The rawhide is broken up and pressed to form bone-shaped chew toys. The bone-shaped chew toys can enhance dogs' enjoyment, while providing health benefits to their teeth, palate and jaw. However, rawhide has little nutritional value and is not easily digested by dogs.

To overcome the shortcomings, the present invention provides a chew toy for pets to mitigate or obviate the aforementioned problems.

SUMMARY OF THE INVENTION

The main objective of the present invention is to provide a chew toy for pets, especially to a chew toy that is easily digested and has a nutritional value.

To achieve the objective, a method for manufacturing a chew toy for pets in accordance with the present invention, comprises steps of: (a) producing a base layer and an outer layer; (b) shaping the base layer; (c) applying the outer layer to the base layer to manufacture a semifinished material; and (d) drying the semifinished material to obtain the chew toy, wherein the base layer comprises poprice, sweet rice flour and water and the outer layer comprises soybean, animal parts and glycerol. Since the chew toy comprises poprice, sweet rice flour, soybean, animal parts and glycerol, the chew toy has a nutritional value, is easily digested, strengthens their teeth and exercises their palate and jaw.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
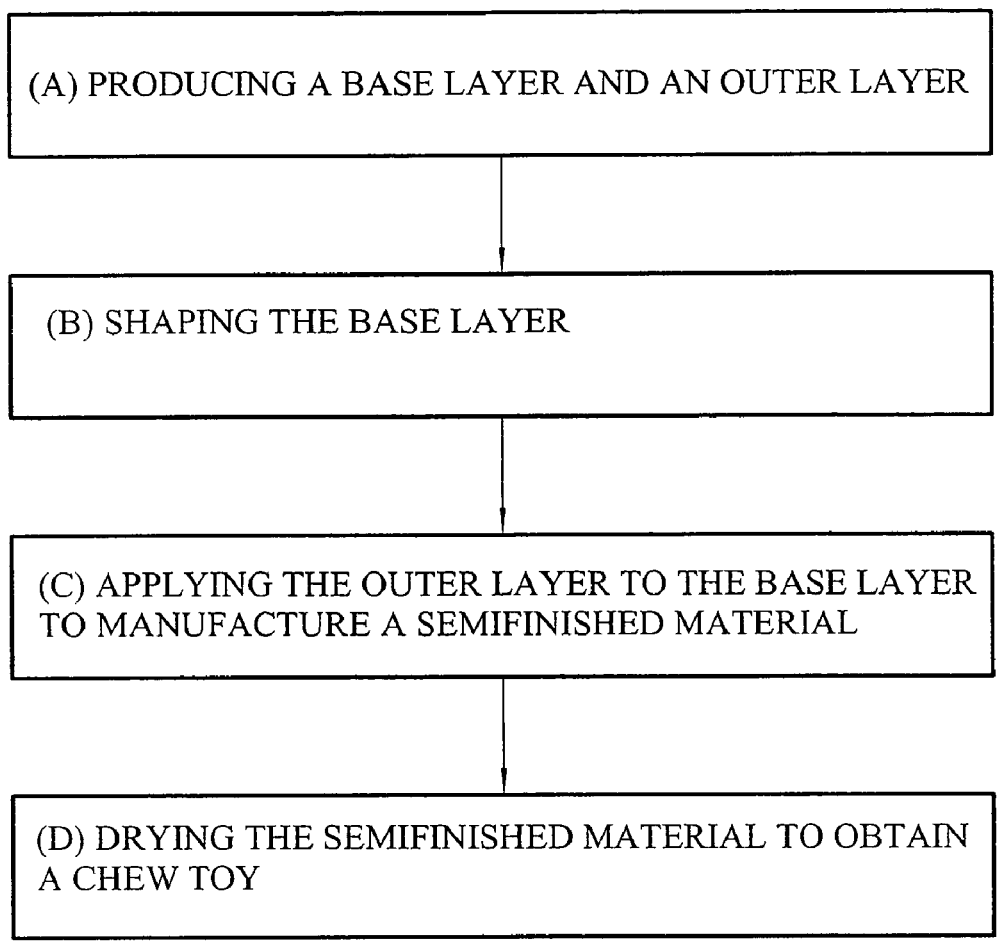
FIG. 1 is a flow chart of a method for producing a chew toy for pets in accordance with the present invention.

With reference to FIG. 1, a method for manufacturing a chew toy for pets in accordance with the present invention comprises steps of: (a) producing a base layer and an outer layer; (c) applying the outer layer to the base layer to manufacture a semifinished material; and (d) drying the semifinished material to obtain the chew toy, wherein the base layer comprises poprice, sweet rice flour and water and the outer layer comprises soybean, animal parts and glycerol, and the method may further have a step (b) shaping the base layer.

Preferably, poprice, sweet rice flour and water are in a weight ratio of 5:0.1:3.

Preferably, soybean, animal parts and glycerol are in a weight ratio of 3:100:4. The animal parts include meat, bones, bone marrow, skin, inner organs, and the like from animals such as pigs, cows, sheep, chicken, fish and the like. The animal parts preferably are chicken breasts.

The following examples further illustrate the present invention but are not to be construed as limiting the invention as defined in the claims appended hereto.

EXAMPLE 1

Figure 2:
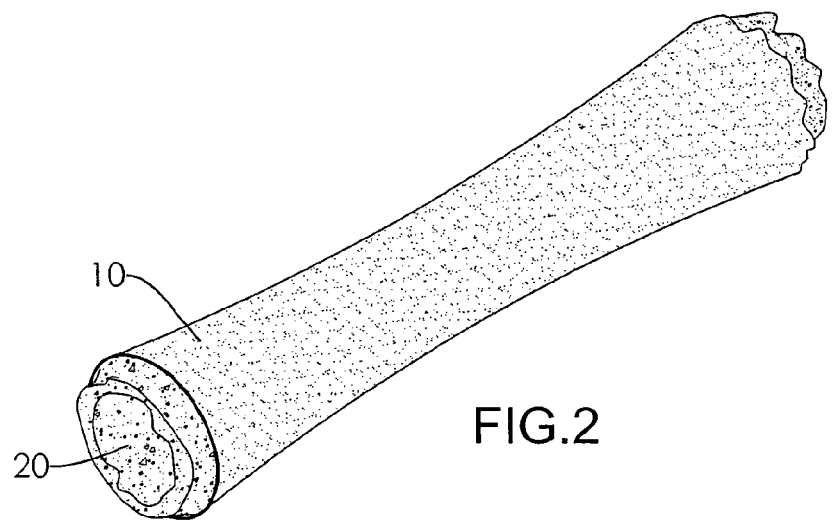
FIG. 2 is a perspective view of a first embodiment of a chew toy for pets produced by the method depicted in FIG. 1.
Figure 3:
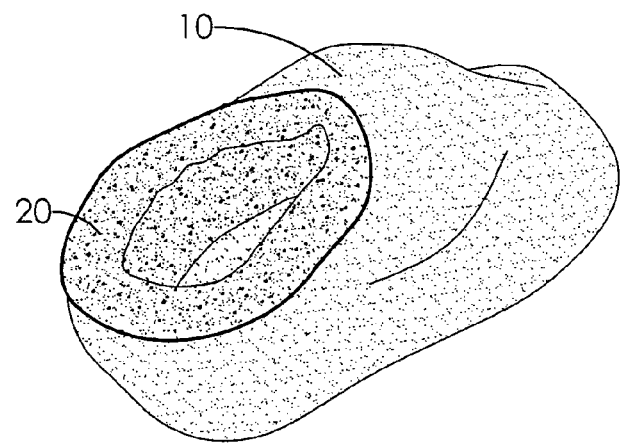
FIG. 3 is a perspective view of a second embodiment of a chew toy for pets produced by the method depicted in FIG. 1.
Figure 4:
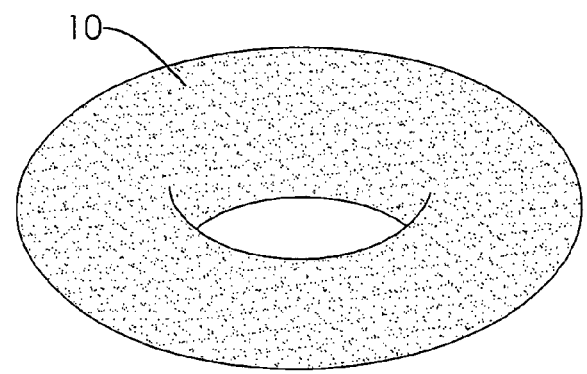
FIG. 4 is a perspective view of a third embodiment of a chew toy for pets produced by the method depicted in FIG. 1.

With reference to FIGS. 2 to 4, rice was heated to make poprice. The poprice, sweet rice flour and water were mixed in a weight ratio of 5:0.1:3 to make a base layer (20). The base layer (20) was frozen at −15° C. for 3 hours then shaped. The soybean, chicken breasts and glycerol in a weight ratio of 3:100:4 were mixed to make an outer layer (10). The outer layer (10) was applied to the base layer (20) to make a semifinished material. The semifinished material was dried by 80° C. air for 2 hours, then 70° C. air for 12 hours to obtain a chew toy.

EXAMPLE 2

The rice was heated to make poprice. Poprice, sweet rice flour and water were mixed in a weight ratio of 5:0.1:3 to make a base layer. The base layer was shaped in a mold. The soybean, chicken breasts and glycerol were mixed in a weight ratio of 3:100:4 to make an outer layer. The outer layer was applied to the base layer to make a semifinished material. The semifinished material was dried by 80° C. air for 2 hours then 70° C. air for 12 hours to obtain a chew toy.

Therefore, the chew toy in accordance with the present invention comprises poprice, sweet rice flour, soybean, animal parts and glycerol so has a nutritional value and is easily digested by pets for health benefits including tooth strengthening and exercising their palate and jaw.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for manufacturing a chew toy for pets comprising the steps of:
   producing a base layer and an outer layer;
   applying the outer layer to the base layer to manufacture a semifinished material; and
   drying the semifinished material to obtain the chew toy,
   wherein the base layer comprises poprice, sweet rice flour and water and the outer layer comprises soybean, animal parts and glycerol.

2. The method for manufacturing a chew toy for pets as claimed in claim 1, wherein poprice, sweet rice flour and water are in a weight ratio of 5:0.1:3.

3. The method for manufacturing a chew toy for pets as claimed in claim 1, wherein the animal parts are chicken breasts and the soybean, animal parts and glycerol are in a weight ratio of 3:100:4.

4. The method for manufacturing a chew toy for pets as claimed in claim 2, wherein soybean, animal parts and glycerol are in a weight ratio of 3:100:4.

5. The method for manufacturing a chew toy for pets as claimed in claim 1 further having a step of shaping the base layer after the step of producing a base layer and an outer layer and before the step of applying the outer layer to the base layer.

6. The method for manufacturing a chew toy for pets as claimed in claim 2 further having a step of shaping the base layer after the step of producing a base layer and an outer layer and before the step of applying the outer layer to the base layer.

7. The method for manufacturing a chew toy for pets as claimed in claim 3 further having a step of shaping the base layer after the step of producing a base layer and an outer layer and before the step of applying the outer layer to the base layer.

8. The method for manufacturing a chew toy for pets as claimed in claim 4 further having a step of shaping the base layer after the step of producing a base layer and an outer layer and before the step of applying the outer layer to the base layer.

9. A chew toy for pets obtained by steps of:
 (a) producing a base layer and an outer layer;
 (c) applying the outer layer to the base layer to manufacture a semifinished material; and
 (d) drying the semifinished material to obtain a chew toy,
 wherein the base layer comprises poprice, sweet rice flour and water and the outer layer comprises soybean, animal parts and glycerol.

* * * * *